United States Patent [19]
Kondo

[11] Patent Number: 5,101,111
[45] Date of Patent: Mar. 31, 1992

[54] METHOD OF MEASURING THICKNESS OF FILM WITH A REFERENCE SAMPLE HAVING A KNOWN REFLECTANCE

[75] Inventor: Noriyuki Kondo, Kyoto, Japan

[73] Assignee: Dainippon Screen Mfg. Co., Ltd., Kyoto, Japan

[21] Appl. No.: 549,194

[22] Filed: Jul. 6, 1990

[30] Foreign Application Priority Data

Jul. 13, 1989 [JP] Japan .................... 1-181244
Jul. 13, 1989 [JP] Japan .................... 1-181245

[51] Int. Cl.$^5$ ............................................. G01V 9/04
[52] U.S. Cl. ................................... 250/560; 356/382
[58] Field of Search ............... 250/560; 356/381, 382, 356/448

[56] References Cited

U.S. PATENT DOCUMENTS

3,017,512 1/1962 Wolbert .................... 356/382
4,676,647 6/1987 Kikkawa et al. .............. 356/382
4,899,055 2/1990 Adams ...................... 356/448

Primary Examiner—David C. Nelms
Assistant Examiner—Que T. Le
Attorney, Agent, or Firm—Lowe, Price, LeBlanc & Becker

[57] ABSTRACT

Prior to measurement of the thickness dx of a thin film which is formed on a substrate, correlation data between the reflectance Rs of the film for light and the thickness dx thereof is stored in a data memory in the form of a table. A reference sample having a known reflectance Rp is prepared and the energy Ep of light reflected from the reference sample is measured. Also measured is the energy Es of light reflected from an objective sample having the thin film and the substrate. A value of the thickness dx is obtained through the table while setting Y=Rp therein, where y is calculated through a fomula $y=(Rp/Ep)\cdot Es$.

4 Claims, 6 Drawing Sheets

METHOD OF MEASURING THICKNESS OF FILM WITH A REFERENCE SAMPLE HAVING A KNOWN REFLECTANCE

BACKGROUND OF THE INVENTION

1. Field of the Invention

The present invention relates to a method of measuring the thickness of a transparent thin film formed on a substrate and, more particularly, to a technique of measuring the film thickness optically with high accuracy.

2. Description of the Related Arts

Conventionally, various methods have been proposed for optically measuring the thickness of a silicon oxide film formed on a silicon substrate, for example, in an inspection step of semiconductor manufacturing process. The conventional methods are classified into three types according to the principles thereof, which will be referred to as "a polarization analysis method", "a reflected light energy measuring method" and "a reflectance measuring method".

In the polarization analysis method, light is irradiated obliquely to an objective sample, and the thickness of a transparent thin film formed on a substrate in the sample is determined on the basis of change of the polarization state of the reflected light thereof. The change of the polarization state has two meanings, one of which is the change of relative phase shifts between a P-wave component having electric field vector parallel to the plane of incidence and an S-wave component vertical thereto, and the other is the change of amplitude ratio of the both waves.

The polarization analysis method employes a device which is called an ellipsometer, and is an excellent technique capable of measuring a film thickness of even 10 nm or less accurately. However, since it is difficult in this method to measure the film thickness by specifying a minute area as a region to be measured on a sample, the reflected light energy measuring method is adopted in place thereof for such measurement of the film thickness.

In the reflected light energy measuring method, the film thickness is measured on the basis of the characteristic that the energy of the light reflected from the objective sample varies in accordance with the thickness of the transparent thin film. The variation of the light energy is caused by the phenomenon that the light reflected from the surface of the transparent thin film and that reflected from the interface between the transparent thin film and the substrate interfere with each other.

More particularly, this method is conducted as follows. After obtaining correlation data between the reflected light energy and the film thicknesses of the transparent thin films in reference samples having the same optical constants of the transparent thin film and the substrate as the objective sample, the reflected light energy of the objective sample is measured. The correlation data is searched for a film thickness approximately corresponding to the reflected light energy measured. The value of the film thickness thus found is taken as the film thickness of the transparent thin film in the objective sample.

The reflectance measuring method is based on the following principle: The reflectance of the objective sample, expressed as Rs, can be uniquely determined, when following conditions are given: a refractive index n0 of the medium on the incidence side (normally which is air because the film thickness is measured in the atmosphere) of the transparent thin film, an absorptivity k0 thereof, a refractive index n1 of the transparent thin film, an absorptivity k1 thereof, a refractive index n2 of the substrate, an absorptivity k2 thereof, a wavelength $\lambda$ of the light, an angle of incidence $\phi$ thereof and the film thickness dx of the transparent thin film. Hence, providing that the values n0, n1, n2, k0, k1, k2, $\lambda$ and $\phi$ are specified, the film thickness dx can be determined when the reflectance Rs is defined.

After correlation data between the reflectance Rs and the film thickness dx are obtained for imaginary samples having the same optical constants as the objective sample, the reflectance Rs of the objective sample is measured with a light having the same, wavelength $\lambda$ and angle of incidence $\phi$ that are used for obtaining the correlation data. The correlation data is searched for a film thickness dx approxiamtely corresponding to the measured reflectance Rs. The value of the film thickness dx thus found is taken as the film thickness dx of the transparent thin film in the objective sample.

As described above, in the reflected light energy measuring method, since the film thickness is measured on the basis of the correlation data between the reflected light energy and the film thicknesses, it is essential to obtain the correlation data in advance. However, it is not easy to obtain it, as described below.

A measured value of the reflected light energy includes influences of the characteristics peculiar to a device used for the measurement, for example, a photoelectric transfer efficiency of photoelectric converter for detecting light source energy and reflected light energy. Hence, the measured value must obtained experientially as follows:

First of all, a number of reference samples having respectively known different film thicknesses of the transparent thin films and the same optical constants of the transparent thin films and substrates as the objective sample are prepared. The respective reflected light energy of the reference samples is measured with the same device as that of the objective sample. The measured results are used as correlation data between the reflected light energy and the film thicknesses.

Since the correlation data cannot attain sufficient accuracy in measuring the film thickness without collecting data to some extent in detail, a large number of reference samples must be prepared. Accordingly, a large amount of work is necessary for measuring the reflected light energy of the reference samples. Besides, it is not easy but requires a large amount of work to prepare a large number of reference samples.

As aforementioned, the conventional reflected light energy measuring method has a problem in that a large amount of work is necessary for preparation process because the correlation data between the reflected light energy and the film thicknesses must be obtained experientially in advance with the device which is actually used for measuring the objective sample.

Contrary to the energy measuring method, the reflectance measuring method does not have the aforementioned problem, because it is based on the correlation data between the reflectance Rs and the film thickness dx. The value of the reflectance Rs does not include influences of the characteristics peculiar to a device used for measurement. Correlation data between the reflectance Rs and the film thickness dx published in various references are usable. They do not need experiential determination as seen in the case of the correlation data between the reflected light energy Es and the film thickness dx which is employed in the reflected light energy measuring method.

However, it is not easy to measure the reflectance Rs of the objective sample. In measuring the reflectance of the objective sample, various measurement conditions, that is, the refractive index n0 of the medium on the incidence side of the transparent thin film, the absorptivity k0 thereof, the wavelength λ of light and the angle of incidence φ thereof must coincide exactly with those used in measuring the reflectance to obtain the correlation data between the reflectance Rs and the film thickness dx in the reference employed.

SUMMARY OF THE INVENTION

The present invention is directed to a method of measuring a thickness dx of a transparent film provided in an objective sample, wherein the film is formed on a substrate and the objective sample has a known correlation between the thickness dx and a reflectance Rs for light.

According to the present invention, the method comprises the steps of: (a) preparing a reference sample whose reflectance Rp for light is known; (b) applying a light to the reference sample and measuring an energy Ep of a light reflected on the reference sample with a measuring means; (c) applying a light to the transparent film of the objective sample and measuring an energy Es of a light reflected on the objective sample with the measuring means; (d) calculating a value $z = (Rp/Ep) \cdot Es$; and (e) converting the value z into a value of the thickness dx through the correlation while setting $z = Rs$.

Preferably, the method further comprises the step of: (f) arranging the correlation in a form of a table and storing the table in a memory means. The step (e) may include the step of: (e-1) converting the value z through the table in the memory means to obtain the value of the thickness dx.

In an aspect of the present invention, the correlation between the reflectance Rs and the thickness dx is modified into a correlation between a ratio Rs/Rp and the thickness dx. After measuring the energy Ep and Es, a ratio $w = Es/Ep$ is calculated. A value of the thickness dx is obtained through the correlation between the ratio Rs/Rp and the thickness dx while setting $w = Rs/Rp$.

Accordingly, it is an object of the present invention to provide a method of measuring a film thickness having both the advantages that the film thickness can be measured by measuring the reflected light energy of the objective sample and that a large amount of work is not necessary for preparation process. In other words, the object of the present invention is to provide a film thickness measuring method wherein the necessity of a large amount of work for preparation process is eliminated and the objective sample can be measured easily.

These and other objects, features, aspects and advantages of the present invention will become more apparent from the following detailed description of the present invention when taken in conjunction with the accompanying drawings.

DESCRIPTION OF PREFERRED EMBODIMENTS

§1. Overall Structure

Figure 1:
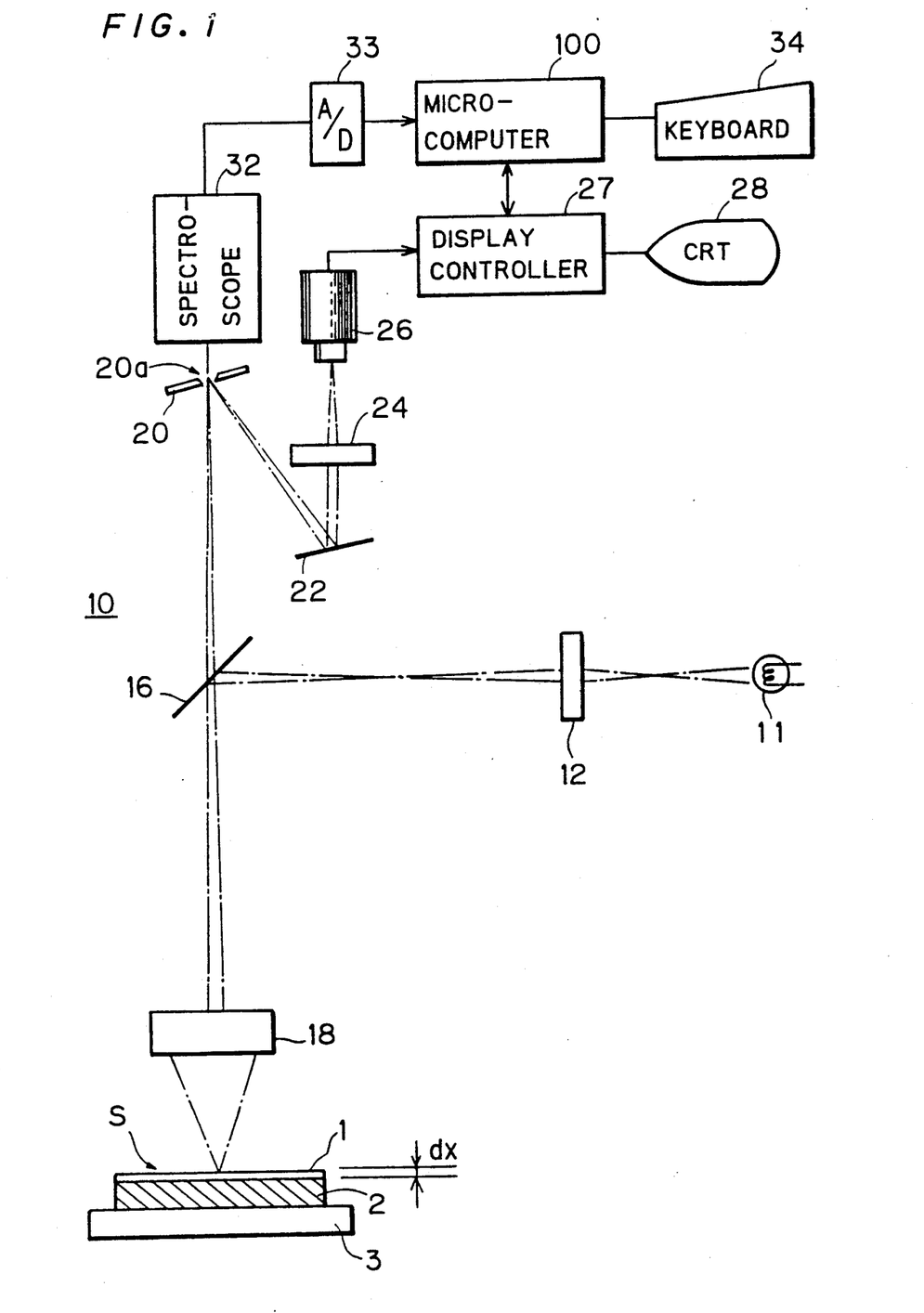
FIG. 1 is a schematic diagram showing the overall structure of a film thickness measuring system according to a first preferred embodiment of the present invention.

FIG. 1 is a schematic diagram of a system for measuring film thickness according to a first preferred embodiment of the present invention. An objective sample S, which is placed on a sample table 3, has a silicon substrate 2 and a silicon oxide film 1 formed thereon. The system is usable to measure the thickness dx of the film 1. Light is irradiated from a light source 11. The light passes through a condensing optics 12, a half mirror 16 and an image-formation optics 18 to reach the top portion of the objective sample S. A part of the light is reflected on the top surface of the film 1 while another part is reflected at the interface between the film 1 and the substrate 2. These parts then interfere with each other to become a reflected light having energy depending on the thickness dx of the film 1.

The reflected light is focused by the image-formation optics 18, and is transmitted to the half mirror 16. The light then reaches a mirror 20 having a pin hole 20a. Part of the light is reflected on the mirror area around the hold 20a and is further reflected by a mirror 22. Then, the light is incident through an image-formation lens 24 onto a camera unit 26.

While observing the top image of the objective sample S which is picked up by the camera unit 26 and displayed on a CRT 28 through a display controller 27, an operator moves the sample table 3 to make an objective region on the sample S come to the position just below the image-formation optics 18. The light source 11 may be a halogen lump irradiating visible white light.

On the other hand, part of the reflected light which passes through the pin hole 20a is received by a spectroscope 32. The spectroscope 32 is operable to split the received light into respective wavelengthes and to detect the light energy Es of a component having a prescribed wavelength λ. Therefore, detector module 10 which consists of the elements 11, 12, 16, 18, 20 and 26 is equivalent to a module in which a monochromatic light having the wavelength λ is used for the measurement. The spectroscope 32 photoelectrically converts the light energy Es into an electric signal representing the value of the light energy Es.

The electric signal is converted into a digital signal through an A/D converter 33 and is transmitted to a microcomputer 100 for calculating the thickness dx of the film 1. The microcomputer 100 is provided with a CPU and a memory, which is so programmed as to conduct the process described later.

§2. Principle of Preferred Embodiment

Before the operation of the system is explained, the principle of measuring the thickness dx which is employed in the preferred embodiment is described. The symbols n0, n1, n2, k0, k1, k2, λ and φ which are introduced in the description of the related arts are also used in the following analysis. That is, n0, k0: the reflective index and the absorptivity of air,
n1, k1: those of the silicon oxide film 1,
n2, k2: those of the silicon substrate 2,
λ: the wavelength of the light which is substantially used for the measurement, and
φ: the incident angle of the light onto the film 1.

The reflectance Rs of the film 1 is a function of the thickness dx thereof and these parameters. Therefore, when the values of the parameters n0~n2, k0~k2, λ and φ are fixed, there is a one-to-one correspdence between the reflectance Rs and the thickness dx. When a variable y representing variation of the reflectance Rs is introduced, the correlation between the variable y and the thickness dx can be easily known from references or data books which are commertially available. For example, "Handbook of Optical Constants of Solids", Academic Press, is one of the reference available. The correlation between the variable y and the thickness dx depends on the values of the optical constants n0~n2, k0~k2, λ and φ. The reference is searched for the data representing the correlation between reflectance and thickness under the same optical constants as the objective sample 1. The correlation data thus found in hereinafter referred to as "the reflectance-thickness correlation data".

On the other hand, the light energy Es which is measured by the detector module 10 is in proportion to the reflectance Rs. Accordingly, the following relation (1) holds:

$$Es = K \cdot Rs \qquad (1)$$

where K is a constant which depends on the character of the optical module 10 but is independent of the type of samples measured. If a reference sample having a known reflectance Rp for light is prepared and measured with the same optical module 10, the light energy Ep which is received by the spectroscope 32 is expected to satisfy the following equation (2).

$$Ep = K \cdot Rp \qquad (2)$$

From the equations (1) and (2), the following equation (3) is obtained.

$$Rs/Rp = Es/Ep \qquad (3)$$

The equation (3) can be modified as:

$$Rs = (Rp/Ep) \cdot Es \qquad (4)$$

The light energy Es and Ep can be detected by the optical module 10 and the reflectance Rp has a known value. Consequently, the reflectance Rs can be obtained through the equation (4) and the thickness dx can be determined by referring to the reflectance-thickness correlation data.

The preferred embodiment is constructed according to the principle described above.

§3. Procedure and Operation

Figure 2:
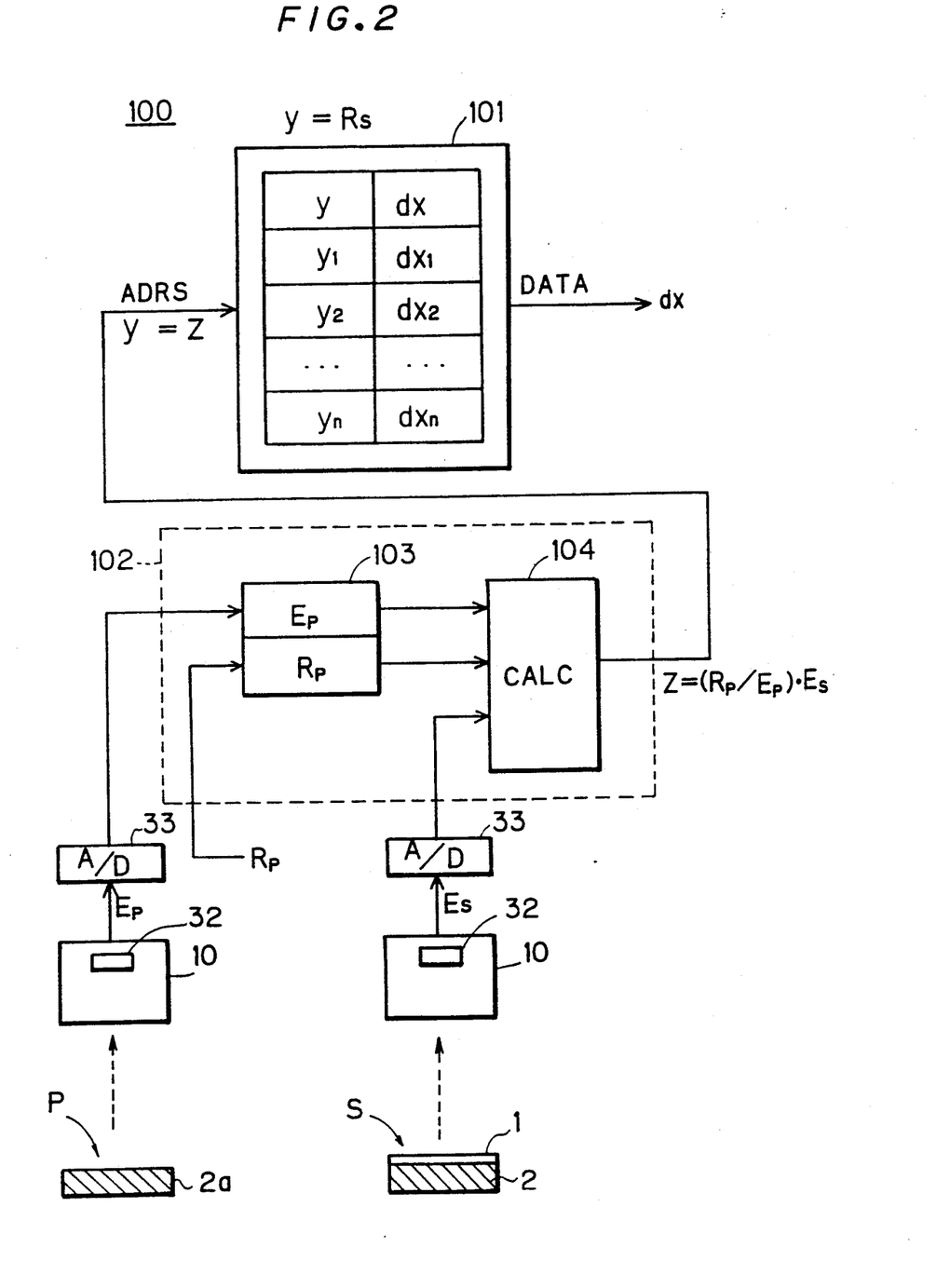
FIG. 2 is a schematic block diagram showing part of the system according to the first preferred embodiment.

The method measuring the thickness dx according to the preferred embodiment is conducted as follows:

First, in preparation process for measuring the thickness dx of the film 1 in the objective sample S, correlation data between the reflectance and film thickness under the same optical constants of the transparent thin film and substrate as the objective sample S is found in the aforementioned reference. The reflectance-thickness correlation data is stored in a data memory 101 (FIG. 2) which is provided in the microcomputer 100. Preferably, the data is stored in a look-up table form. When one value of the reflectance y or Rs is inputted to the memory 101 as an address signal, one value of the thickness dx corresponding thereto is outputted from the memory 101. In FIG. 2, symbols $y_1$-$y_n$ and $dx_1$-$dx_n$ represent respective discrete values of the reflectance Rs and the thickness dx corresponding thereto, respectively. The number n is an integer larger than one.

Further previous preparation is to prepare one reference sample whose reflectance Rp is known. The reference sample may have a structure where a transparent thin film is formed on a substrate. Alternatively, the reference sample may have a substrate only. The optical constants of the reference sample may be different from those of the object sample S. As long as the reflectance Rp of the reference sample is known, other optical constants of the reference sample may be unknown.

Preferably, the reference sample is made of materials whose optical constants are not extremely different from those of the objective sample S. In the preferred embodiment, a reference sample, which is shown in FIG. 2 as a sample P, has a substrate 2a only which is made of the same material with the objective sample S, i.e., silicon.

Prior to the objective sample S, the reference sample P is placed on the sample table 3 and the detector module 10 is enabled to measure the energy Ep of the light component which has the wavelength λ and is included in the light reflected from the reference sample P. Although each of the detector module 10 and the A/D converter 33 is shown in FIG. 2 in duplication for convenience of illustration, only a single detector module and a single A/D converter are provided in the actual system for measuring the light energy as shown in FIG. 1. The value Ep of the energy detected by the spectroscope 32 is stored in a register 103 provided in the microcomputer 100. Besides, through a keyboard 34 (FIG. 1), the known value of the reflectance Rp of the reference sample P is stored in the register 103.

When the above preparation process has been completed, the reference sample P on the sample table 3 is replaced by the objective sample S and the energy Es of the light component which has the wavelength λ and is included in the light reflected from the objective sample S is measured by the detector module 10. A calculator 104 receives the value Es from the module 10 together with the values Ep and Rp from the register 103 to calculate a value z as:

$$z = (Rp/Ep) \cdot Es \qquad (5)$$

The register 103 and the calculator 104 are main elements of a data converter 102, whose function may be attained through a software program of the microcomputer 100.

The value z is transmitted to the data memory 101 as an address signal y thereof. In response to the input of the address signal y, the data memory 101 outputs a value of the thickness dx corresponding to the address signal y. For example, when z (=y)=y₂, the value dx₂ of the thickness dx is outputted. The value of the thickness dx is delivered to the CRT 28 through the display controller 27 and is displayed thereon. The value of the thickness dx may be printed on a recording sheet with a printer (not shown).

Although the wavelength λ of the measured light in measuring the reflected light energy Ep of the reference sample P and that of the light in measuring the energy Es of the light reflected from the objective sample S must coincide with each other, the value of the common wavelength λ is arbitrary.

§4. Advantage of First Preferred Embodiment

The first preferred embodiment, capable of determining the film thickness dx by measuring the energy Es of the light reflected from the objective sample, does not require complex work in preparation process.

Also, the determination of the film thickness according to the preferred embodiment does not employ the correlation data between the energy Es of the reflected light and the film thickness dx as seen in the conventional techniques according to the energy measuring method, but employs the correlation data between the reflectance Rs and the film thickness dx, thereby having following advantages.

The correlation data between the reflected light energy Es and the film thickness dx can be obtained only experientially, because the reflected light energy Es includes the characteristics peculiar to measuring devices. A large amount of work is required to obtain it. On the contrary, the correlation data between the reflectance Rs and the film thickness dx neither includes characteristics peculiar to measuring devices, nor requires experiential obtainment in each measurement. It can be obtained easily from various references.

The conventional film thickness measuring techniques according to the reflected light energy measuring method require a large amount of work of preparing many reference samples and measuring the energy of each reflected light in advance, however the film thickness measuring method of the preferred embodiment does not. In the preferred embodiment, it is necessary to prepare a refernece sample having a known reflectance in advance and to measure the reflected light energy Ep thereof, because of the calculation of the reflectance Rs of the objective sample S is attained through use of the value Rp. However, only one reference sample is sufficient, and the reflected light energy is measured only once. The preparation process, though necessary, needs remarkably less work in the preferred embodiment, as compared with the conventional film thickness measuring techniques according to the reflected light energy measuring method.

§5. Second Preferred Embodiment

Figure 3:
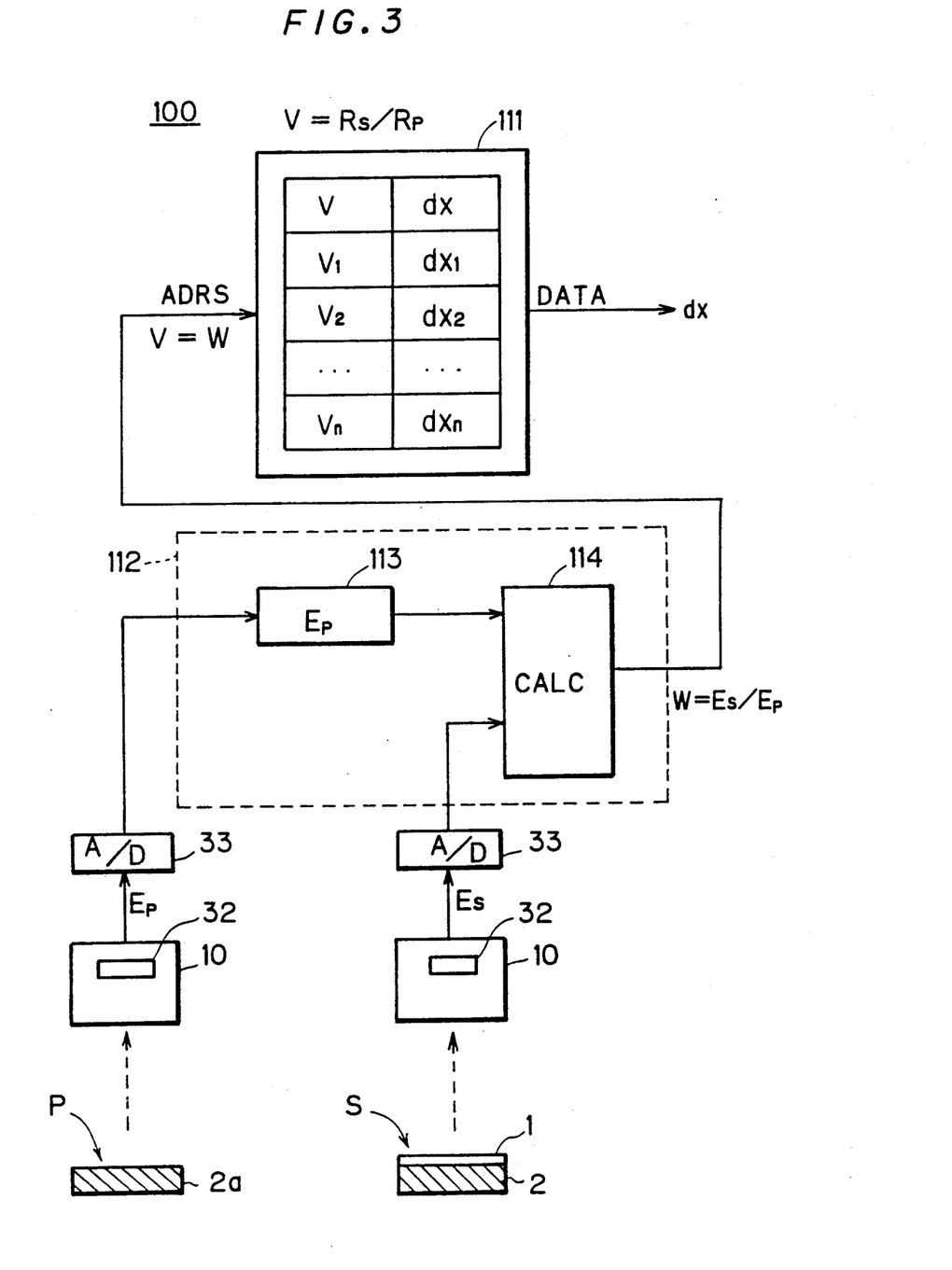
FIG. 3 is a schematic block diagram showing the part of a system according to a second preferred embodiment of the present invention.

FIG. 3 is a schematic diagram of a system according to a second preferred embodiment of the present invention. The overall structure of this system is the same with the first preferred embodiment shown in FIG. 1. The second preferred embodiment is based on the equation (3). The reference sample P having the known reflectance Rp is also employed. The reflectance-thickness correlation data is obtained from the aforementioned reference, and is converted into modified correlation data which represents the correlation between the ratio:

$$v = Rs/Rp \qquad (6)$$

and the thickness dx. The modified correlation data can be obtained by dividing the respective values of the reflectance Rs by the value Rp in the reflectance-thickness correlation data represented in a table form. The division may be carried out with an electric calculator.

The modified correlation data is stored in a data memory 111 (FIG. 3) in the form of a look-up table form. Then, the reflected light energy Ep for the reference sample P is measured with the detector module 10. The value Ep is stored in a register 113 provided in a data converter 112. After replacing the reference sample P with the objective sample S, the detector module 10 is enabled again and the reflected light energy Es of the objective sample S is measured. The value Es is fed to a calculator 114, which calculates the ratio w as:

$$w = Es/Ep \qquad (7)$$

The signal representing the ratio w is transmitted to the data memory 111 as an address signal v. An address designated by the signal v=w is accessed and one value of the thickness dx is outputted for the data memory 111. For example, when the respective values of the ratio v are $v_1, v_2, \ldots, v_n$ and the address signal v is $v_2$, the value $dx_2$ of the thickness dx is outputted. The value of the thickness dx is displaced on the CRT 28.

§6. Advantage of Second Preferred Embodiment

The advantage which is explained in §4 is also applied to the second preferred embodiment. The modified correlation data is easily obtained through the search of the reference and the division by the reflectance Rp. Only a single reference sample is required, and a large amount of work is not necessary in the preparation process.

§7. Generalization

Figure 4:
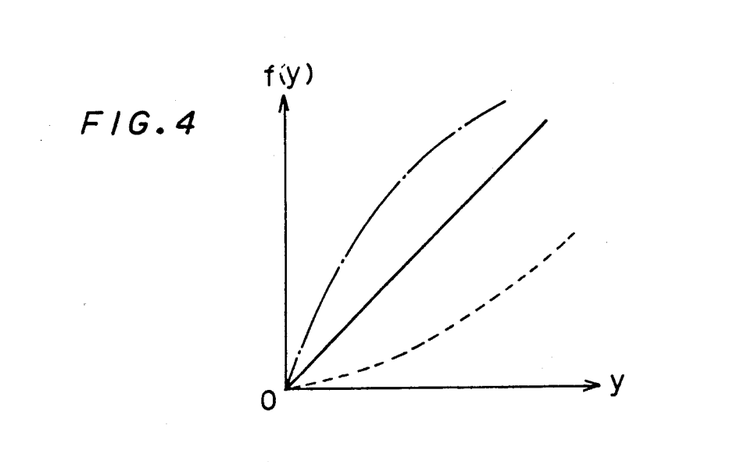
FIG. 4 is a graph showing examples of a function f(y)
Figure 5:
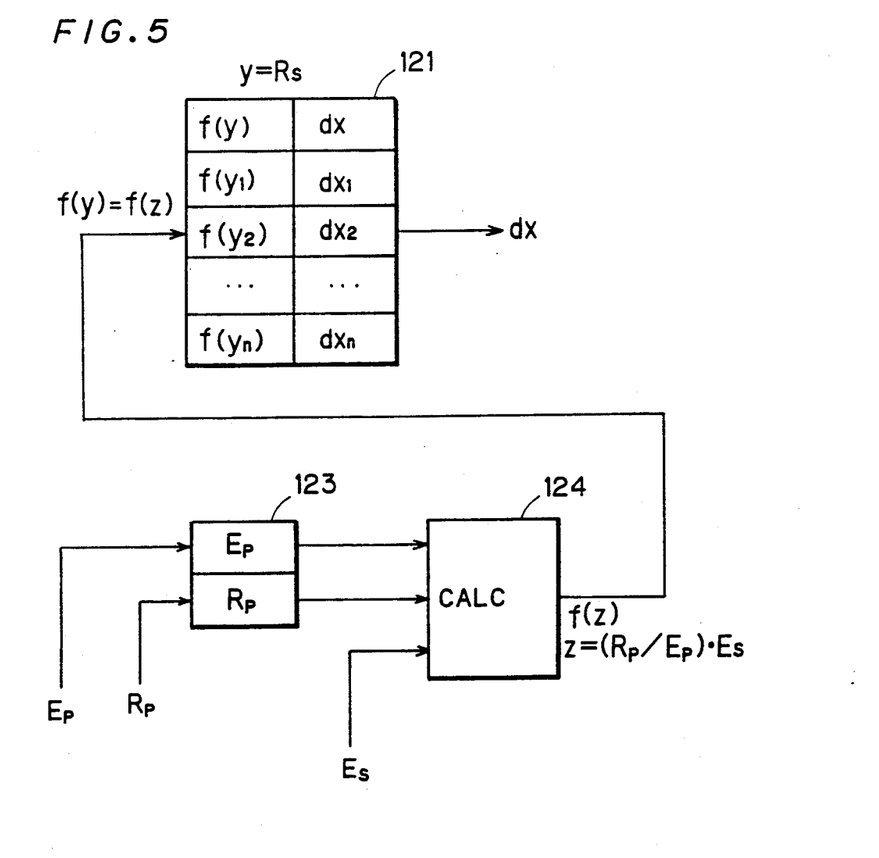
FIG. 5 is a schematic block diagram showning part of a modified system.

The present invention can be generalized as follows:

Suppose a monotone function f(y) of the variable y. Some examples thereof are shown in FIG. 4. Then, the reflectance-thickness correlation data is modified by calculating f(y) for respective values $y = y_1, y_2, \ldots, y_n$ to obtain a modified correlation data. The modified correlation data is stored in a memory 121 (FIG. 5). The known value of the reflectance Rp and the measured value Ep are stored in a register 123. When the energy Es is measured, a calculator 124 calculates the value of the function f(z) from respective values Ep, Rp and Es. The value f(z) is transmitted to the data memory 121 as an address signal f(y). One value of the thickness dx corresponding to the address f(y)=f(z) is outputted from the data memory 121. Other constructions and operations are the same with the first preferred embodiment.

If the monotone function f(y) is a linear function as shown by a solid line in FIG. 4, the system shown in FIG. 5 coincides with that of FIG. 2.

Figure 6:
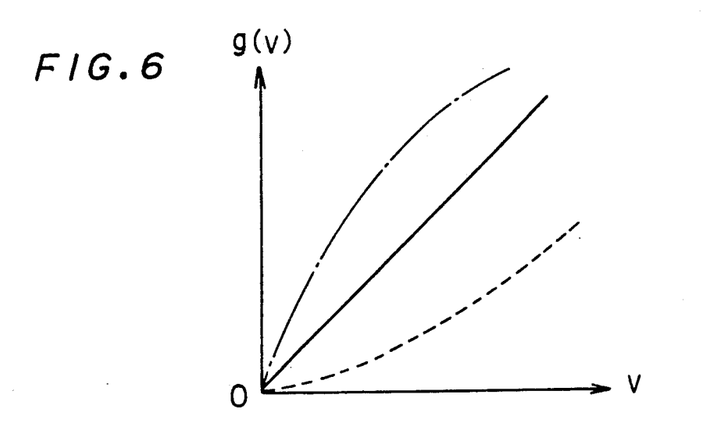
FIG. 6 is a graph showing examples of a function g(v)
Figure 7:
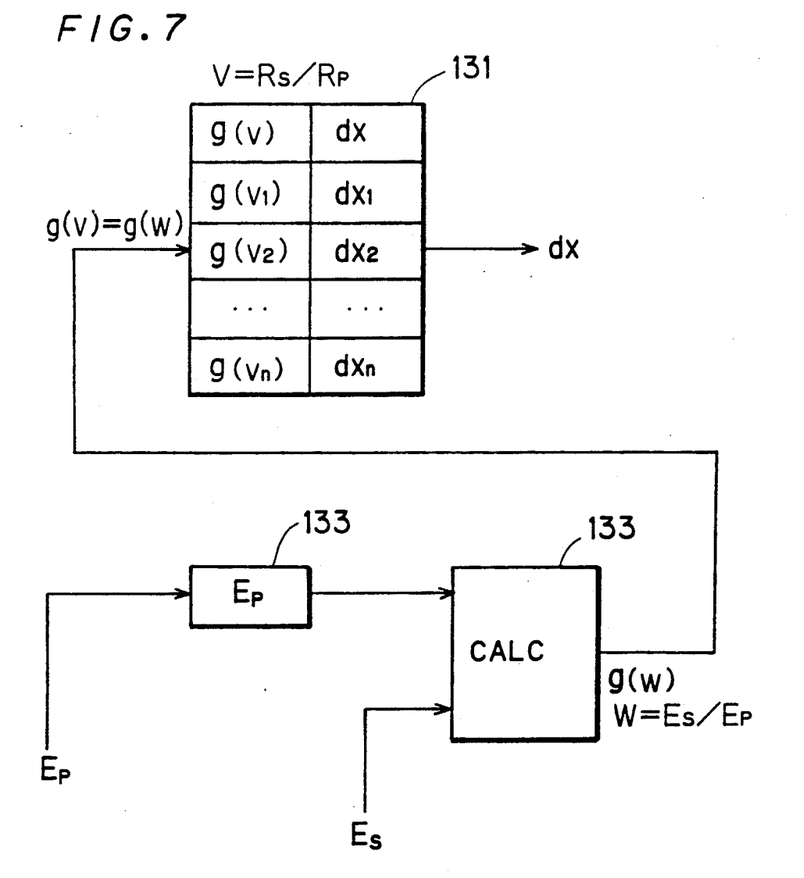
FIG. 7 is a schematic block diagram showing part of another modified system.

A similar generalization can be applied to the second preferred embodiment. A monotone function g(v) is selected, whose examples are shown in FIG. 6. The reflectance-thickness correlation data is so modified as to represent the correlation between the respective values $g(v)-g(v_n)$ and $dx_1-dx_n$ by calculating the values of the function g(v) for $v = v_1, v_2, \ldots, v_n$, and is stored in a data memory 131. A calculator 134 calculates a value g(w) from the values Ep and Es. The value Ep is previously measured and stored in a register 133. The value g(w) is transmitted to the data memory 131 as an address signal thereof. A value of the thickness dx corresponding to the address g(v)=g(w) is outputted from the data memory 131. Other constructions and operations are the same with the second preferred embodiment.

In the function g(v) is a linear function, the system shown in FIG. 7 coincides with the system of FIG. 3 according to the second preferred embodiment.

These generalizations are also effective since the constant K depending on the characteristics of the measuring device, which is the detector module 10 in the embodiment, does not appear the values of the functions f(y), f(z), g(v) and g(w) as well as the values y, x, v and w. The functions f(y) and g(v) may be exponential functions, logarithmic functions or other monotone functions as well as linear functions.

Figure 8:
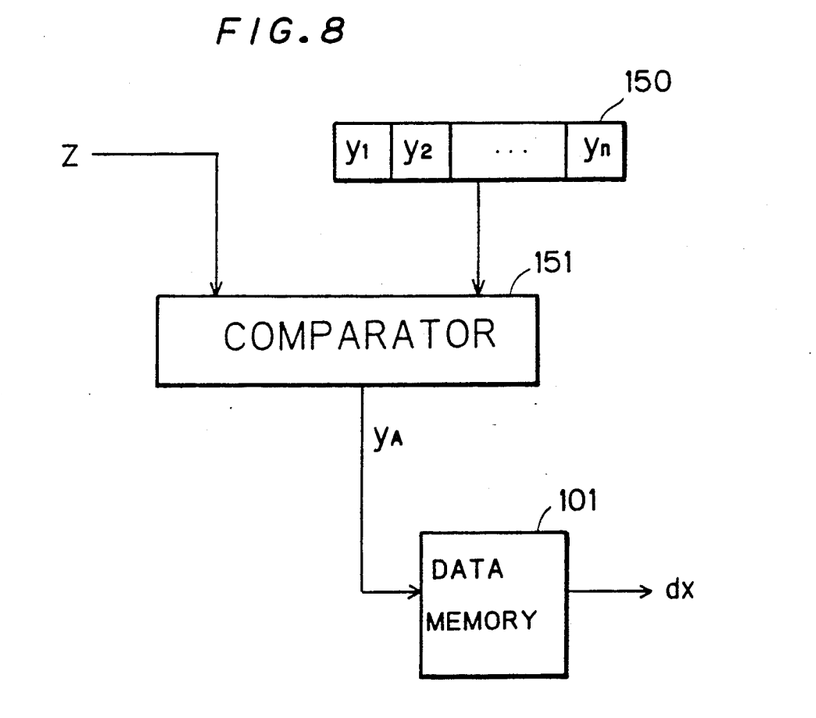
FIG. 8 is a schematic block diagram showing a circuitry for obtaining an approximate value of y in a correlation data.

FIG. 8 illustrates part of a system according to another preferred embodiment, where other constructions are the same with the first preferred embodiment. This system is operable to specify the value of the thickness dx even if a value of the thickness dx is not given at the address which is designated by the calculated value z. In this system, the calculated value z is transmitted to a comparator 151. The respective values $y_1$-$y_n$ are stored in a memory 150, and the comparator 151 compares the value z with respective values $y_1$-$y_n$ to find a value $y_A$ which is nearest to the value z among $y_1$-$y_n$. The value $y_A$ thus found is transmitted to the data memory 101 in which the reflectance-thickness correlation data is previously stored as is in the first preferred embodiment. The value of the thickness dx corresponding to the address $y_A$ is outputted from the data memory 101. Such a system is effective when the number n of the data components in the reflectance-thickness correlation data is not so large, for example.

Similar modifications can be applied to the systems shown in FIGS. 4–7. When the symbols z, $y_1$-$y_n$ and $y_A$ are respectively replaced with:

w, $v_1$-$v_n$ and $v_A$;
f(z), f($y_1$)–f($y_n$) and $f_{yA}$; or
g(w), g($v_1$)–g($v_n$) and $g_{vA}$, the modification for the system shown in FIGS. 4, 5, 6 or 7 is obtained, where;

$v_A$; the nearest value to w within $v_1$-$v_n$
$f_{yA}$; the nearest value to f(z) within f($y_1$)–f($y_n$); and
$g_{vA}$; the nearest value to g(w) within g($v_1$)–g($v_n$).

In these cases, the data memory 101 in FIG. 8 is replaced with the data memory 111, 121 or 131.

Interporation circuits for interporation the values of the thickness dx may be provided in place of the construction shown in FIG. 8.

Although the present invention has been described and illustrated in detail, it is clearly understood that the same is by way of illustration and example only and is not to be taken by way of limitation. The spirit and scope of the present invention should be limited only by the terms of the appended claims.

I claim:

1. A method of measuring a thickness dx of a transparent film provided in an objective sample, wherein said film is formed on a substrate and said objective sample has a known first correlation between a thickness dx and a reflectance Rs for light, said method comprising the steps of:
    (a) preparing a reference sample whose reflectance Rp for light is known;
    (b) modifying said first correlation into a second correlation between a ratio Rs/Rp and thickness dx;
    (c) applying a light to said reference sample and measuring an energy Ep of a light reflected on said reference sample with a measuring means;
    (d) applying a light to said transparent film of said objective sample and measuring an energy Es of a light reflected on said objective sample with said measuring means;
    (e) calculating a ratio w=Es/Ep; and
    (f) accessing a specific value of a thickness dx using said second correlation by setting w=Rs/Rp.

2. The method of claim 1, further comprising the step of:
    (g) arranging said second correlation in a form of a table and storing said table in a memory means;
    the step (f) including the step of:
    (f-1) converting said value w through said table in said memory means to obtain said value of said thickness dx.

3. The method of claim 2, wherein:
    the step (g) includes the step of:
    (g-1) storing said table in said memory means in a form of a look-up table.

4. The method of claim 3, wherein;
    the step (g) includes the step of:
    (g-1) making said table for discrete values $v_1$, $v_2$, ..., $v_n$ of said ratio v;
    the step (f-1) includes the steps of:
    (f-1-1) obtaining a value $v_A$ which is nearest to said value w among said discrete values $v_1$, $v_2$, ..., $v_n$;
    (f-1-2) converting said value $v_A$ through said table into said value of said thickness dx.

* * * * *